United States Patent
Lu

(10) Patent No.: US 11,113,474 B2
(45) Date of Patent: Sep. 7, 2021

(54) ADDRESS ANALYSIS USING MORPHEMES

(71) Applicant: Advanced New Technologies Co., Ltd., George Town (KY)

(72) Inventor: Qing Lu, Hangzhou (CN)

(73) Assignee: Advanced New Technologies Co., Ltd., Grand Cayman (KY)

(\*) Notice: Subject to any disclaimer, the term of this patent is extended or adjusted under 35 U.S.C. 154(b) by 177 days.

(21) Appl. No.: 15/944,569

(22) Filed: Apr. 3, 2018

(65) Prior Publication Data

US 2018/0225282 A1 Aug. 9, 2018

Related U.S. Application Data

(63) Continuation of application No. PCT/CN2016/101447, filed on Oct. 8, 2016.

(30) Foreign Application Priority Data

Oct. 10, 2015 (CN) .......................... 201510652677.8

(51) Int. Cl.
    *G06F 40/30*  (2020.01)
    *G06F 40/53*  (2020.01)
    *G06F 40/268* (2020.01)

(52) U.S. Cl.
    CPC ............ *G06F 40/30* (2020.01); *G06F 40/268* (2020.01); *G06F 40/53* (2020.01)

(58) Field of Classification Search
    CPC ......... G06F 40/30; G06F 40/53; G06F 40/268
    See application file for complete search history.

(56) References Cited

U.S. PATENT DOCUMENTS

| 5,423,032 A | 6/1995 | Byrd et al. |
| 8,290,961 B2 * | 10/2012 | Chew .................... G06F 16/334 |
| | | 707/748 |

(Continued)

FOREIGN PATENT DOCUMENTS

| CN | 103399907 | 11/2013 |
| CN | 103425640 | 12/2013 |

(Continued)

OTHER PUBLICATIONS

Ghosh, "Identifying Duplicate Records with Fuzzy Matching," Mawazo Blog, Sep. 9, 2013 ( herein "Ghosh NPL," available at https://pkghosh.wordpress.com/2013/09/09/identifying-duplicate-records-with-fuzzy-matching/, (Year: 2013).*

Chang et al., "On Chinese Postal Address and Associated Information Extraction," Proceedings of the National Conference of the Society for Artificial Intelligence , 2012 , JSAI2012 vol. 26th Annual Conference, 2012, https://doi.org/10.11517/pjsai.JSAI2012.0_3M2IOS3b3 (Year: 2012).*

(Continued)

*Primary Examiner* — Michelle M Koeth

(74) *Attorney, Agent, or Firm* — Fish & Richardson P.C.

(57) ABSTRACT

A computer-implemented method comprises: receiving a first address and a second address, the first address including n morphemes and the second address including m morphemes, wherein a morpheme is a smallest semantic unit in the address, and wherein n and m are both natural numbers; determining first correlation values between the n morphemes and the m morphemes; obtaining, based on the first correlation values and a preset algorithm, a second correlation value between the first address and the second address; and analyzing a correlation between the first address and the second address based on the second correlation value.

17 Claims, 2 Drawing Sheets

(56) References Cited

U.S. PATENT DOCUMENTS

| | | | |
|---|---|---|---|
| 2001/0019329 A1* | 9/2001 | Kobayashi | G06F 40/109 345/467 |
| 2007/0213974 A1* | 9/2007 | Xu | G06F 40/211 704/9 |
| 2007/0233462 A1 | 10/2007 | Kim | |
| 2015/0254327 A1* | 9/2015 | Patil | G06F 16/13 707/739 |
| 2016/0147943 A1* | 5/2016 | Ash | G06N 7/005 705/3 |
| 2016/0217186 A1* | 7/2016 | Agarwal | G06F 16/22 |

FOREIGN PATENT DOCUMENTS

| | | |
|---|---|---|
| CN | 104679728 | 6/2015 |
| CN | 104699668 | 6/2015 |
| CN | 107086920 | 8/2017 |
| CN | 107358551 | 11/2017 |
| CN | 107705114 | 2/2018 |
| JP | 2004030323 | 1/2004 |
| TW | 201525908 | 7/2015 |
| WO | WO 2017043674 | 3/2017 |

OTHER PUBLICATIONS

Davis et al., "Assessing the Certainty of Locations Produced by an Address Geocoding System," Geoinformatica (Jan. 2007), Springer Science + Business Media, 11:103-129, DOI 10.1007/S10707-006-0015-7. (Year: 2007).*

International Search Report issued by the International Searching Authority in International Application No. PCT/CN2016/101447 dated Jan. 5, 2017; 9 pages.

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

European Extended Search Report in European Application No. 16853101.0, dated Oct. 22, 2018, 8 pages.

PCT International Preliminary Report on Patentability in International Application No. PCT/CN2016/101447, dated Apr. 10, 2018, 10 pages (with English translation).

* cited by examiner

ADDRESS ANALYSIS USING MORPHEMES

This application is a continuation of PCT Application No. PCT/CN2016/101447, filed on Oct. 8, 2016, which claims priority to Chinese Patent Application No. 201510652677.8, filed on Oct. 10, 2015, and each application is incorporated by reference in its entirety.

BACKGROUND

The present application relates to the field of computer technologies, and in particular, to techniques for address analysis. In e-commerce transactions, transaction orders for physical goods can exhibit challenges and problems. For example, transaction orders that include a delivery address (for example, a home or a business street address) written in English can include textual information that exhibits subtle distinctions in spelling, varying habits of writing order, and other current conditions. In another example, a delivery address in a non-native English speaking region can create a great challenge when analyzing and correlating address information.

SUMMARY

The present disclosure describes techniques for determining the similarity between addresses. In an implementation, a computer-implemented method comprises: receiving a first address and a second address, the first address including n morphemes and the second address including m morphemes, wherein a morpheme is a smallest semantic unit in the address, and wherein n and m are both natural numbers; determining first correlation values between the n morphemes and the m morphemes; obtaining, based on the first correlation values and a preset algorithm, a second correlation value between the first address and the second address; and analyzing a correlation between the first address and the second address based on the second correlation value.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, this technique can avoid the problem, in conventional systems, of dependence on single words where two addresses are used as two strings and an edit distance between the two strings is calculated to analyze a correlation between the addresses. Second, the accuracy and applicability of address analysis can be improved.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Techniques for address analysis can be applied to scenarios in which a correlation between addresses is analyzed. The correlation can include correlations of differences and similarities. For example, the techniques can be used to analyze a correlation between addresses in an e-commerce transaction associated with physical goods. In some implementations, the analysis result of the correlation between addresses can be a foundation for cluster analysis, term frequency analysis, address standardization, or used in other applications of address similarities.

In e-commerce transactions, transaction orders for physical goods can exhibit challenges and problems. For example, transaction orders that include a delivery address (for example, a home or a business street address) written in English can include textual information that exhibits subtle distinctions in spelling, varying habits of writing order, and other current conditions. In another example, a delivery address in a non-native English speaking region can create a great challenge when analyzing and correlating address information.

In conventional technologies, during address analysis, when a correlation between two English addresses is analyzed, for example, the two English addresses can be handled or represented as two long strings. In a first technique, a correlation between the two English addresses can be analyzed by calculating an edit distance between the two long strings. Alternatively, in a second technique, the two English addresses can be pre-processed before correlation occurs. During the pre-processing, words in each of the English addresses can be sorted based on their initials, and repeated words can be deleted. Then, the two pre-processed English addresses can be used as two long strings, and an edit distance between the two long strings can be calculated. Finally, the correlation between the two English addresses can be analyzed based on the edit distance.

However, each of the two techniques has its disadvantages. For example, the first technique can depend greatly on positions of words in the English addresses. Once a sequence reversal or repetition of the words occurs in the English addresses, the edit distance can be increased, which can affect the accuracy of the address analysis. Although the second technique can reduce the impact of the sequence and repetition of the words, the second technique's dependence on the initials of the words can render the technique inapplicable to English addresses containing non-native English content. For example, non-native English content can occur when a non-English word has several different counterparts in English, such as Hlinka and Glinka, which are both common English spellings of Глинка in Russian.

Figure 1:
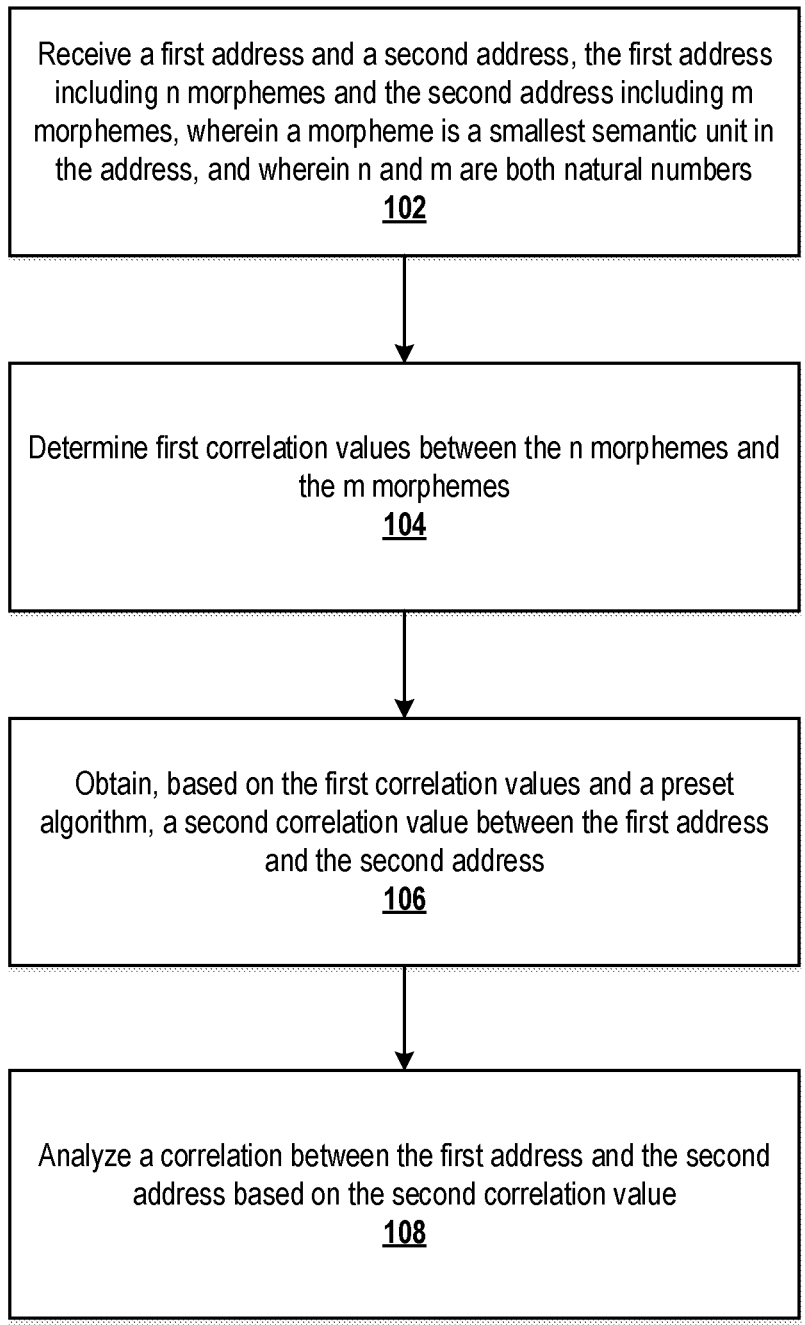
FIG. 1 is a flowchart illustrating an example of a computer-implemented method for address analysis, according to an implementation of the present disclosure.

FIG. 1 is a flowchart illustrating an example of a computer-implemented method 100 for address analysis, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, a first address and a second address are received. The first address includes n morphemes, and the second address includes m morphemes. By definition, a morpheme is a smallest semantic unit in the address. The values n and m, associated with the morphemes of the first address and the second address, are both natural numbers. As an example, the first address and the second address can be can be received based on user input on a form, or one address can be received from a form, and the other address can be retrieved from a database or another source. The first address and the second address can have the same definition, meaning that they both apply to the same physical street address. For example, the first address can include a Chinese address, an English address, or an address in another language. In some implementations, when the address is a Chinese address, standardization (or normalization) can be performed before additional processing is performed. For example, traditional Chinese characters can be converted into simplified Chinese characters. Then, the standardized Chinese address can be segmented into n terms, and the n terms can be used as the n morphemes. For an English address, n words included in the first address can be used directly as the n morphemes.

In some implementations, when the first address or the second address is a Chinese address, one term can be used as one morpheme. In some implementations, when the first address or the second address is an English address, one word can be used as one morpheme. From 102, method 100 proceeds to 104.

At 104, first correlation values between the n morphemes and the m morphemes are determined. For example, one of the first correlation values can include a difference value between the two addresses, and another one of the first correlation values can include a similarity value between the two addresses. The difference value can include, for example, an edit distance value. The similarity value can include, for example, a hamming distance value, a Jaccard distance value, an N-Gram distance value, a Jaro-Winkler (JW) distance value, or a cosine distance value. In examples provided in the present disclosure, the first correlation value is an edit distance value. The edit distance value can indicate an edit distance between two morphemes. The edit distance can refer, for example, to a number of edit transformations (including delete transformations, insert transformations, and replace transformations) that are required for changing one morpheme into another morpheme. In some implementations, the edit distance can be calculated based on a classic edit distance algorithm. In some implementations, the edit distance can be calculated using an adjusted edit distance algorithm that can, for example, increase the difference of replace transformations or reduce the difference based on a lack of vowels or some other condition. For example, assuming that one morpheme is cafe and another morpheme is coffee, a process of changing cafe into coffee can be: cafe→caffe→coffe→coffee. In this example, three edit transformations are required. Therefore, an edit distance value between cafe and coffee can be considered to be three.

In some implementations, when the first address or the second address is a Chinese address, before step 104 is performed, morphemes included in the first address or the second address can also be pre-processed as follows. By using the first address as an example, each morpheme (or term) in the first address can be transformed into phonetic alphabets or strokes. That is, the processed first address can include n groups of phonetic alphabets or n groups of strokes. Then, first correlation values between the n groups of phonetic alphabets included in the first address and m groups of phonetic alphabets included in the second address can be determined. Alternatively, the first correlation values between the n groups of strokes included in the first address and m groups of strokes included in the second address can be determined. The determination technique can be similar to techniques for determining the first correlation values between n words included in the first address and m words included in the second address.

In some implementations, step 104 can include the following steps, in which first correlation values between each of the n morphemes and the m morphemes are determined to obtain n×m first correlation values. First, an $i^{th}$ morpheme in the n morphemes can be obtained in sequence, where i=1, 2, . . . , n. Second, a $i^{th}$ morpheme in the m morphemes can be obtained in sequence, where j=1, 2, . . . , m. Third, a first correlation value between the $i^{th}$ morpheme and the $j^{th}$ morpheme can be calculated. Fourth, all the n morphemes and all the m morphemes can be traversed to obtain n×m first correlation values.

In an example, both the first address and the second address can be English addresses. That is, the first address can include n words, and the second address can include m words. Assume that n is 3, and the three words included in the first address are X, Y, and Z, respectively. Also assume that m is 4, and the four words included in the second address are A, B, C, and D, respectively. Then, the first correlation values between X and the four morphemes A, B, C, and D, respectively can be determined; the first correlation values between Y and the four morphemes A, B, C, and D, respectively can be determined; and the first correlation values between Z and the four morphemes A, B, C, and D, respectively can determined. As a result, 3×4 first correlation values can be obtained. When the first correlation value between X and A can be indicated as d(A, X), the obtained 3×4 first correlation values can be as shown in Table 1:

TABLE 1

| Correlation Values | | | | |
|---|---|---|---|---|
| | A | B | C | D |
| X | d(A, X) | d(B, X) | d(C, X) | d(D, X) |
| Y | d(A, Y) | d(B, Y) | d(C, Y) | d(D, Y) |
| Z | d(A, Z) | d(B, Z) | d(C, Z) | d(D, Z) |

In some implementations, other forms of Table 1 can be used. From 104, method 100 proceeds to 106.

At 106, using the first correlation values and a preset algorithm, a second correlation value between the first address and the second address is obtained. The second correlation value between the first address and the second address can be obtained, for example, based on the first correlation values and an algorithm that relates addresses. In some implementations, the preset algorithm can include a Hungarian algorithm, an exhaustion algorithm, or some other algorithm. In the present disclosure, the preset algorithm that is used in examples is a Hungarian algorithm.

In some implementations, step 106 can include the following sub-steps. First, a second morpheme that best matches a first morpheme can be selected. Second, a second correlation value between the first address and the second address can be obtained based on the n target correlation values.

In the first sub-step of step 106, a second morpheme that best matches a first morpheme in the n morphemes can be selected from the m morphemes based on the n×m first correlation values and the preset algorithm. Then, a target correlation value between the first morpheme and the second morpheme can be recorded until n target correlation values are recorded. The first morpheme can be any morpheme in the first address. When the first address includes n morphemes, the number of the first morphemes can be n, and the number of the second morphemes that match the first morphemes can be n. Therefore, the number of recorded target correlation values can also be n. In some implementations, selecting the second morpheme that best matches the first morpheme can further include: 1) constructing an n×m matrix based on the n×m first correlation values, 2) pre-processing the n×m matrix based on the preset algorithm, and 3) selecting the second morpheme that best matches the first morpheme, where the selection is made from the m morphemes based on the pre-processed n×m matrix.

In some implementations, when the first correlation value is an edit distance value, selecting the second morpheme that best matches the first morpheme can include solving the optimal matching problem of the edit distance value. In this way, it can be assured that a corresponding word can be found in the second address for each word in the first address, and the overall difference value can be minimized. When an optimal matching problem of the edit distance value is solved, the pre-processing can include, for example, subtracting the smallest element of each row in a matrix from a given row of elements and/or subtracting the smallest element of each column from a given column of elements.

As an example, if the first correlation value between the $i^{th}$ morpheme and the $j^{th}$ morpheme is used as an element in the $i^{th}$ row and the $j^{th}$ column of a matrix, then the matrix constructed by the 3×4 first correlation values in the foregoing example can be as follows:

$$\begin{bmatrix} 3 & 5 & 1 & 2 \\ 4 & 3 & 5 & 3 \\ 4 & 2 & 2 & 4 \end{bmatrix}. \quad (1)$$

Moreover, after the matrix is pre-processed based on a preset algorithm, the following matrix can be obtained:

$$\begin{bmatrix} 1 & 4 & 0 & 1 \\ 0 & 0 & 2 & 0 \\ 1 & 0 & 0 & 2 \end{bmatrix}. \quad (2)$$

In some implementations, pre-processing the matrix can be done using any feasible technique. Further, an independent zero element in each row can be marked in the resulting matrix. That is, in matrix (2), the 0 values can be marked in each of (first row, third column), (second row, first column), and (third row, second column). This can result in an optimal matching combination between morphemes in two addresses. Table 1 can be updated to Table 2 based on the pre-processed matrix and the marked independent zero elements, as shown in Table 2:

TABLE 2

Updated Correlation Values

|   | A | B | C | D |
|---|---|---|---|---|
| X | 1 | 4 | <u>0</u> | 1 |
| Y | <u>0</u> | 0 | 2 | 0 |
| Z | 1 | <u>0</u> | 0 | 2 |

The underlined 0 entries in Table 2 represent independent zero elements marked in the pre-processed matrix. It can be seen from Table 2 that (because the distance value is zero) when the first morpheme is X, the second morpheme that best matches the first morpheme is C, and a target correlation value d(C, X) between X and C can be recorded. When the first morpheme is Y, the second morpheme that best matches the first morpheme is A, and a target correlation value d(A, Y) between Y and A can be recorded. When the first morpheme is Z, the second morpheme that best matches the first morpheme is B, and a target correlation value d(B, Z) between Z and B can be recorded. That is, three target correlation values can be recorded.

In the second sub-step of step 106, the second correlation value between the first address and the second address can be obtained based on the n target correlation values. In an example, the n target correlation values can be summed, and the sum of the n target correlation values can be used as the second correlation value between the first address and the second address. As in the foregoing example, the second correlation value between the first address and the second address can be d(C, X)+d(A, Y)+d(B, Z)=1+4+2=7. In this example, the values 1, 4, and 2 can be obtained from Table 1. From 106, method 100 proceeds to 108.

At 108, a correlation between the first address and the second address are analyzed based on the second correlation value. For example, analyzing the correlation between the first address and the second address can be based on a difference value and a similarity value.

In some implementations, when the second correlation value determined in step 106 is a difference value, a greater second correlation value between the first address and the second address can indicate a smaller similarity between these two addresses. In another example, when the second correlation value determined in step 106 is a similarity value, the first address and the second address can be determined to be more similar to each other if the similarity value between these two addresses is closer to 1. Further, the first address and the second address can be determined to be less similar to each other if the similarity value between these two addresses is closer to 0. In addition, when the second correlation value determined in step 106 is a similarity value, the similarity value can be converted into a difference value, for example, by calculating the log of the similarity value and obtaining a negative value of the log. In some implementations, the resulting analysis result of the correlation in the present disclosure can be the foundation for other applications, such as cluster analysis, term frequency analysis, and address standardization. After 108, method 100 stops.

Figure 2:
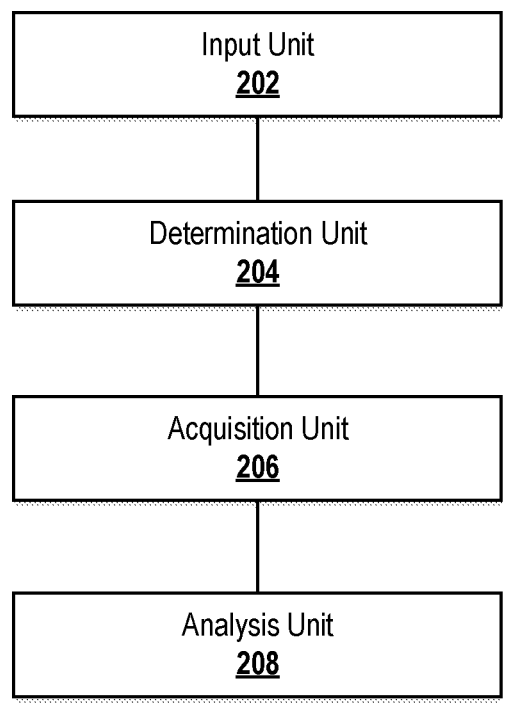
FIG. 2 is a block diagram illustrating an example of a system for determining address similarity, according to an implementation of the present disclosure.

FIG. 2 is a block diagram illustrating an example of a system 200 for determining address similarity, according to an implementation of the present disclosure. The system 200 includes an input unit 202, a determination unit 204, an acquisition unit 206, and an analysis unit 208.

The input unit 202 can be configured to input a first address and a second address. The first address can include n morphemes and the second address can include m morphemes, where the morpheme is the smallest semantic unit in the address, and where n and m are both natural numbers.

The determination unit 204 can be configured to determine first correlation values between the n morphemes and the m morphemes. For example, the determination unit 204 can be configured to determine first correlation values between each of the n morphemes and the m morphemes to obtain n×m first correlation values. The first correlation value can be, for example, an edit distance value, a hamming distance value, a Jaccard distance value, an N-Gram distance value, a JW distance value, or a cosine distance value.

The acquisition unit 206 can be configured to obtain a second correlation value between the first address and the second address based on the first correlation values determined by the determination unit 204 and a preset algorithm. For example, the acquisition unit 206 can be configured to perform the following. First, a second morpheme can be selected (from the m morphemes) that best matches a first morpheme (in the n morphemes). The selection can be based on the n×m first correlation values and the preset algorithm. Second, target correlation values can be recorded that are between the first morpheme and the second morpheme, where the recording continues until n target correlation values are recorded. Third, the second correlation value can be identified that is between the first address and the second address. Identification of the second correlation value can be based on the n target correlation values.

In some implementations, selecting the second morpheme that best matches a first morpheme can include the following. First, an n×m matrix can be constructed that is based on the n×m first correlation values. Second, the n×m matrix can be pre-processed based on the preset algorithm. Third, the second morpheme that best matches the first morpheme can be selected based on the pre-processed n×m matrix.

The analysis unit 208 can be configured to analyze a correlation between the first address and the second address. The analysis can be based on the second correlation value obtained by the acquisition unit 206.

Described implementations of the subject matter can include one or more features, alone or in combination.

For example, in a first implementation, a computer-implemented method comprises: receiving a first address and a second address, the first address including n morphemes and the second address including m morphemes, wherein a morpheme is a smallest semantic unit in the address, and wherein n and m are both natural numbers; determining first correlation values between the n morphemes and the m morphemes; obtaining, based on the first correlation values and a preset algorithm, a second correlation value between the first address and the second address; and analyzing a correlation between the first address and the second address based on the second correlation value.

The foregoing and other described implementations can each, optionally, include one or more of the following features:

A first feature, combinable with any of the following features, wherein determining the first correlation values comprises determining the first correlation values between each of the n morphemes and the m morphemes to obtain n×m first correlation values.

A second feature, combinable with any of the previous or following features, wherein obtaining the second correlation value between the first address and the second address comprises: selecting a second morpheme that best matches a first morpheme in the n morphemes from the m morphemes based on the n×m first correlation values and the preset algorithm; recording a target correlation value between the first morpheme and the second morpheme until n target correlation values are recorded; and obtaining a second correlation value between the first address and the second address based on the n target correlation values.

A third feature, combinable with any of the previous or following features, wherein selecting the second morpheme that best matches the first morpheme comprises: constructing an n×m matrix based on the n×m first correlation values; and pre-processing the n×m matrix based on the preset algorithm.

A fourth feature, combinable with any of the previous or following features, the method further comprising selecting the second morpheme based on the pre-processed n×m matrix.

A fifth feature, combinable with any of the previous or following features, wherein the first correlation value is an edit distance value, a hamming distance value, a Jaccard distance value, an N-Gram distance value, a JW distance value, and a cosine distance value.

A sixth feature, combinable with any of the previous or following features, further comprising converting traditional Chinese characters in an address to simplified Chinese characters prior to determining the first correlation values.

In a second implementation, non-transitory, computer-readable medium storing one or more instructions executable by a computer system to perform operations comprising: receiving a first address and a second address, the first address including n morphemes and the second address including m morphemes, wherein a morpheme is a smallest semantic unit in the address, and wherein n and m are both natural numbers; determining first correlation values between the n morphemes and the m morphemes; obtaining, based on the first correlation values and a preset algorithm, a second correlation value between the first address and the second address; and analyzing a correlation between the first address and the second address based on the second correlation value.

The foregoing and other described implementations can each, optionally, include one or more of the following features:

A first feature, combinable with any of the following features, wherein determining the first correlation values comprises determining the first correlation values between each of the n morphemes and the m morphemes to obtain n×m first correlation values.

A second feature, combinable with any of the previous or following features, wherein obtaining the second correlation value between the first address and the second address comprises: selecting a second morpheme that best matches a first morpheme in the n morphemes from the m morphemes based on the n×m first correlation values and the preset algorithm; recording a target correlation value between the first morpheme and the second morpheme until n target correlation values are recorded; and obtaining a second correlation value between the first address and the second address based on the n target correlation values.

A third feature, combinable with any of the previous or following features, wherein selecting the second morpheme that best matches the first morpheme comprises: constructing an n×m matrix based on the n×m first correlation values; and pre-processing the n×m matrix based on the preset algorithm.

A fourth feature, combinable with any of the previous or following features, the operations further comprising selecting the second morpheme based on the pre-processed n×m matrix.

A fifth feature, combinable with any of the previous or following features, wherein the first correlation value is an edit distance value, a hamming distance value, a Jaccard distance value, an N-Gram distance value, a JW distance value, and a cosine distance value.

A sixth feature, combinable with any of the previous or following features, the operations further comprising converting traditional Chinese characters in an address to simplified Chinese characters prior to determining the first correlation values.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a first address and a second address, the first address including n morphemes and the second address including m morphemes, wherein a morpheme is a smallest semantic unit in the address, and wherein n and m are both natural numbers; determining first correlation values between the n morphemes and the m morphemes; obtaining, based on the first correlation values and a preset algorithm, a second correlation value between the first address and the second address; and analyzing a correlation between the first address and the second address based on the second correlation value.

The foregoing and other described implementations can each, optionally, include one or more of the following features:

A first feature, combinable with any of the following features, wherein determining the first correlation values comprises determining the first correlation values between each of the n morphemes and the m morphemes to obtain n×m first correlation values.

A second feature, combinable with any of the previous or following features, wherein obtaining the second correlation value between the first address and the second address comprises: selecting a second morpheme that best matches a first morpheme in the n morphemes from the m morphemes based on the n×m first correlation values and the preset algorithm; recording a target correlation value between the first morpheme and the second morpheme until n target correlation values are recorded; and obtaining a second correlation value between the first address and the second address based on the n target correlation values.

A third feature, combinable with any of the previous or following features, wherein selecting the second morpheme that best matches the first morpheme comprises: constructing an n×m matrix based on the n×m first correlation values; and pre-processing the n×m matrix based on the preset algorithm.

A fourth feature, combinable with any of the previous or following features, the operations further comprising selecting the second morpheme based on the pre-processed n×m matrix.

A fifth feature, combinable with any of the previous or following features, wherein the first correlation value is an edit distance value, a hamming distance value, a Jaccard distance value, an N-Gram distance value, a JW distance value, and a cosine distance value.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on non-transitory computer storage media for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple Compact Discs (CDs), Digital Video Discs (DVDs), magnetic disks, or other storage devices).

The operations described in this specification can be implemented as operations performed by a data processing apparatus on data stored on one or more computer-readable storage devices or received from other sources.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "computing device" encompass all kinds of apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include, in addition to hardware, code that creates an execution environment for the computer program in question, for example, code that constitutes processor firmware, a protocol stack, a database management system, an operating system (for example, LINUX, UNIX, WINDOWS, MAC OS, ANDROID, IOS, another operating system, or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile device, a personal digital assistant (PDA), a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including, by way of example, semiconductor memory devices, for example, erasable programmable read-only memory (EPROM), electrically-erasable programmable read-only memory (EEPROM), and flash memory devices; magnetic disks, for example, internal hard disks or removable disks; magneto-optical disks; and CD-ROM and DVD-ROM disks. The processor and the memory can be supplemented by, or incorporated in, special-purpose logic circuitry.

Mobile devices can include mobile telephones (for example, smartphones), tablets, wearable devices (for example, smart watches, smart eyeglasses, smart fabric, smart jewelry), implanted devices within the human body (for example, biosensors, smart pacemakers, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments of the subject matter described in this specification can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented using computing devices interconnected by any form or medium of wireline or wireless digital data communication (or combination thereof), for example, a communication network. Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Worldwide Interoperability for Microwave Access (WIMAX), Long Term Evolution (LTE), Code Division Multiple Access (CDMA), 5G protocols, IEEE 802.11 a/b/g/n or 802.20 protocols (or a combination of 802.11x and 802.20 or other protocols consistent with the present disclosure), Internet Protocol (IP), Frame Relay, Asynchronous Transfer Mode (ATM), ETHERNET, or other protocols or combinations of protocols. The communication network can transmit voice, video, biometric, or authentication data, or other information between the connected computing devices.

Embodiments of the subject matter described in this specification can be implemented using clients and servers interconnected by a communication network. A client and server are generally remote from each other and typically interact through a communication network. The relationship of client and server arises by virtue of computer programs running on the respective computers and having a client-server relationship to each other. A client, for example, a mobile device, can carry out transactions itself, with a server, or through a server, for example, performing buy, sell, pay, give, send, or loan transactions, or authorizing the same.

While this specification contains many specific implementation details, these should not be construed as limitations on the scope of the disclosure and what is claimed. Certain features that are described in this specification in the context of separate implementations can also be implemented, in combination, in a single implementation. Conversely, various features that are described in the context of a single implementation can also be implemented in multiple implementations, separately, or in any suitable sub-combination. While operations are described and claimed in a particular order, this should not be understood as requiring that such operations be performed in the particular order shown or in sequential order, or that all illustrated operations be performed (some operations can be considered optional). As appropriate, multitasking or parallel-processing (or a combination of multitasking and parallel-processing) can be performed.

What is claimed is:

1. A computer-implemented method comprising:
    receiving a first address and a second address representing one or more physical locations involved in an online transaction, the first address including n morphemes and the second address including m morphemes, wherein a morpheme is a smallest semantic unit in an address, and wherein n and m are both natural numbers;
    determining first correlation values between the n morphemes and the m morphemes;
    for each of the n morphemes as a first morpheme:
        selecting a second morpheme of the m morphemes that best matches the first morpheme based on the first correlation values and a preset algorithm; and
        recording a target correlation value between the first morpheme and the second morpheme as part of a set of n target correlation values;
    obtaining a second correlation value between the first address and the second address based on the n target correlation values, wherein the second correlation value is a summation of a plurality of values of the n target correlation values; and
    analyzing a correlation between the first address and the second address based on the second correlation value.

2. The computer-implemented method of claim 1, wherein determining the first correlation values comprises determining the first correlation values between each of the n morphemes and the m morphemes to obtain n×m first correlation values.

3. The computer-implemented method of claim 2, wherein selecting the second morpheme that best matches the first morpheme comprises:
    constructing an n×m matrix based on the n×m first correlation values; and
    pre-processing the n×m matrix based on the preset algorithm.

4. The computer-implemented method of claim 3, further comprising selecting the second morpheme based on the pre-processed n×m matrix.

5. The computer-implemented method of claim 1, wherein a value of the first correlation values is an edit distance value, a hamming distance value, a Jaccard distance value, an N-Gram distance value, a Jaro-Winkler (JW) distance value, or a cosine distance value.

6. A non-transitory, computer-readable medium storing one or more instructions executable by a computer system to perform operations comprising:
    receiving a first address and a second address representing one or more physical locations involved in an online transaction, the first address including n morphemes and the second address including m morphemes, wherein a morpheme is a smallest semantic unit in an address, and wherein n and m are both natural numbers;
    determining first correlation values between the n morphemes and the m morphemes;
    for each of the n morphemes as a first morpheme:
        selecting a second morpheme of the m morphemes that best matches the first morpheme based on the first correlation values and a preset algorithm; and
        recording a target correlation value between the first morpheme and the second morpheme as part of a set of n target correlation values;
    obtaining a second correlation value between the first address and the second address based on the n target correlation values, wherein the second correlation value is a summation of a plurality of values of the n target correlation values; and
    analyzing a correlation between the first address and the second address based on the second correlation value.

7. The non-transitory, computer-readable medium of claim 6, wherein determining the first correlation values comprises determining the first correlation values between each of the n morphemes and the m morphemes to obtain n×m first correlation values.

8. The non-transitory, computer-readable medium of claim 7, wherein selecting the second morpheme that best matches the first morpheme comprises:
    constructing an n×m matrix based on the n×m first correlation values; and
    pre-processing the n×m matrix based on the preset algorithm.

9. The non-transitory, computer-readable medium of claim 8, the operations further comprising selecting the second morpheme based on the pre-processed n×m matrix.

10. The non-transitory, computer-readable medium of claim 6, wherein a value of the first correlation values is an edit distance value, a hamming distance value, a Jaccard distance value, an N-Gram distance value, a Jaro-Winkler (JW) distance value, or a cosine distance value.

11. A computer-implemented system, comprising: one or more computers; and
    one or more computer memory devices interoperably coupled with the one or more computers and having tangible, non-transitory, machine-readable media storing one or more instructions that, when executed by the one or more computers, perform one or more operations comprising:
    receiving a first address and a second address representing one or more physical locations involved in an online transaction, the first address including n morphemes and the second address including m morphemes, wherein a morpheme is a smallest semantic unit in an address, and wherein n and m are both natural numbers;
    determining first correlation values between the n morphemes and the m morphemes;
    for each of the n morphemes as a first morpheme:
        selecting a second morpheme of the m morphemes that best matches the first morpheme based on the first correlation values and a preset algorithm; and
        recording a target correlation value between the first morpheme and the second morpheme as part of a set of n target correlation values;
    obtaining a second correlation value between the first address and the second address based on the n target correlation values, wherein the second correlation value is a summation of a plurality of values of the n target correlation values; and
    analyzing a correlation between the first address and the second address based on the second correlation value.

12. The computer-implemented system of claim 11, wherein determining the first correlation values comprises determining the first correlation values between each of the n morphemes and the m morphemes to obtain n×m first correlation values.

13. The computer-implemented system of claim 12, wherein selecting the second morpheme that best matches the first morpheme comprises:
- constructing an n×m matrix based on the n×m first correlation values; and
- pre-processing the n×m matrix based on the preset algorithm.

14. The computer-implemented system of claim 13, the operations further comprising selecting the second morpheme based on the pre-processed n×m matrix.

15. The computer-implemented system of claim 11, wherein a value of the first correlation values is an edit distance value, a hamming distance value, a Jaccard distance value, an N-Gram distance value, a Jaro-Winkler (JW) distance value, or a cosine distance value.

16. The computer-implemented method of claim 1, further comprising pre-processing the first address by varying a writing order of the first address to account for regional differences.

17. The non-transitory, computer-readable medium of claim 6, further comprising pre-processing the first address by varying a writing order of the first address to account for regional differences.

* * * * *